US011002407B1

(12) United States Patent
Alekseyev et al.

(10) Patent No.: US 11,002,407 B1
(45) Date of Patent: May 11, 2021

(54) GREASE GUN WITH PUMP PRIME INDICATOR

(71) Applicant: Lincoln Industrial Corporation, St. Louis, MO (US)

(72) Inventors: Viktor Alekseyev, St. Louis, MO (US); Keith Rohan, Fenton, MO (US)

(73) Assignee: LINCOLN INDUSTRIAL CORPORATION, Saint Louis, MO (US)

( * ) Notice: Subject to any disclaimer, the term of this patent is extended or adjusted under 35 U.S.C. 154(b) by 0 days.

(21) Appl. No.: 16/677,402

(22) Filed: Nov. 7, 2019

(51) Int. Cl.
*F16N 29/04* (2006.01)
*F16N 5/00* (2006.01)

(52) U.S. Cl.
CPC .............. *F16N 29/04* (2013.01); *F16N 5/00* (2013.01); *F16N 2260/05* (2013.01); *F16N 2260/12* (2013.01)

(58) Field of Classification Search
CPC ........ F16N 29/04; F16N 5/00; F16N 2260/05; F16N 2260/12
USPC ............................ 222/23, 256, 262, 263, 334
See application file for complete search history.

(56) References Cited

U.S. PATENT DOCUMENTS

| 6,736,292 | B2 * | 5/2004 | Grach | F16N 11/10 |
| | | | | 222/262 |
| 6,923,348 | B2 * | 8/2005 | Grach | F16N 11/10 |
| | | | | 222/262 |
| 7,289,878 | B1 * | 10/2007 | Estelle | B05C 5/02 |
| | | | | 222/1 |
| 2007/0119860 | A1 * | 5/2007 | Urata | F16N 11/08 |
| | | | | 222/58 |
| 2013/0081903 | A1 * | 4/2013 | Alekseyev | F16N 3/12 |
| | | | | 184/26 |
| 2015/0114991 | A1 * | 4/2015 | Alekseyev | F16N 29/02 |
| | | | | 222/63 |
| 2015/0114992 | A1 * | 4/2015 | dos Santos | F16N 13/02 |
| | | | | 222/63 |
| 2016/0169446 | A1 * | 6/2016 | Peters | H04B 5/0062 |
| | | | | 222/1 |

* cited by examiner

*Primary Examiner* — Vishal Pancholi
(74) *Attorney, Agent, or Firm* — Stinson LLP

(57) ABSTRACT

A grease dispensing device includes a grease drive system for moving grease through grease passaging. A sensor is arranged to sense grease in the grease passaging and to generate sensor data related thereto. After a delay period, a prime indicator changes between first and second states based on the sensor data to indicate whether or not the grease dispensing device is primed with grease. The grease dispensing device also includes a grease controller operatively connected to the sensor and the prime indicator. The grease dispensing device monitors the sensor data to determine whether the grease dispensing device is primed with grease and controls the operation of the prime indicator accordingly. The grease controller includes a tangible storage medium which stores executable instructions to change the state of the prime indicator based on the sensor data and to delay changing the state of the prime indicator for the delay period after the controller determines the grease dispensing device is not primed with grease.

10 Claims, 5 Drawing Sheets

GREASE GUN WITH PUMP PRIME INDICATOR

FIELD

The present disclosure generally relates to grease guns. More particularly, the disclosure relates to grease guns with a pump prime indicator.

BACKGROUND

Grease guns are used to deliver lubrication in a variety of mechanical settings, including for lubricating bearings. Industrial grease guns generally include a piston that draws in grease from a cartridge into a priming chamber during an upstroke, and expels the grease from the chamber during a downstroke. Grease guns can be powered in a variety of ways, for example, by hand, pneumatics, or by an electric driver. Electrically-driven grease guns generally rely on a battery to provide the power source.

SUMMARY

In one aspect, a grease dispensing device comprises a housing and a grease passaging supported by the housing. The grease passaging includes a grease inlet for receiving grease from a supply of grease, and the grease passaging includes a grease dispensing outlet for dispensing grease from the grease dispensing device. A grease drive system is arranged with respect to the grease passaging to move grease through the grease passaging toward the grease dispensing outlet. A sensor is supported by the housing and is arranged to sense grease in the grease passaging and to generate sensor data related thereto. A user interface comprises a prime indicator. The prime indicator is configured to change between at least first and second states based on the sensor data. The prime indicator in the first state represents the grease dispensing device is primed with grease. The prime indicator in the second state represents the grease dispensing device is not primed with grease. The grease dispensing device also includes a grease controller with a tangible storage medium. The grease controller is operatively connected to the sensor for monitoring the sensor data to determine whether the grease dispensing device is primed with grease. The grease controller is operatively connected to the prime indicator for controlling operation of the prime indicator. The tangible storage medium stores grease controller executable instructions to change the state of the prime indicator based on the sensor data. The instructions include delay instructions to delay changing the prime indicator from the first state to the second state for a delay period after the controller determines the grease dispensing device is not primed with grease.

Other objects and features will be in part apparent and in part pointed out hereinafter.

BRIEF DESCRIPTION OF THE DRAWINGS

Corresponding parts are indicated by corresponding reference characters throughout the several views of the drawings.

DETAILED DESCRIPTION

Figure 1:
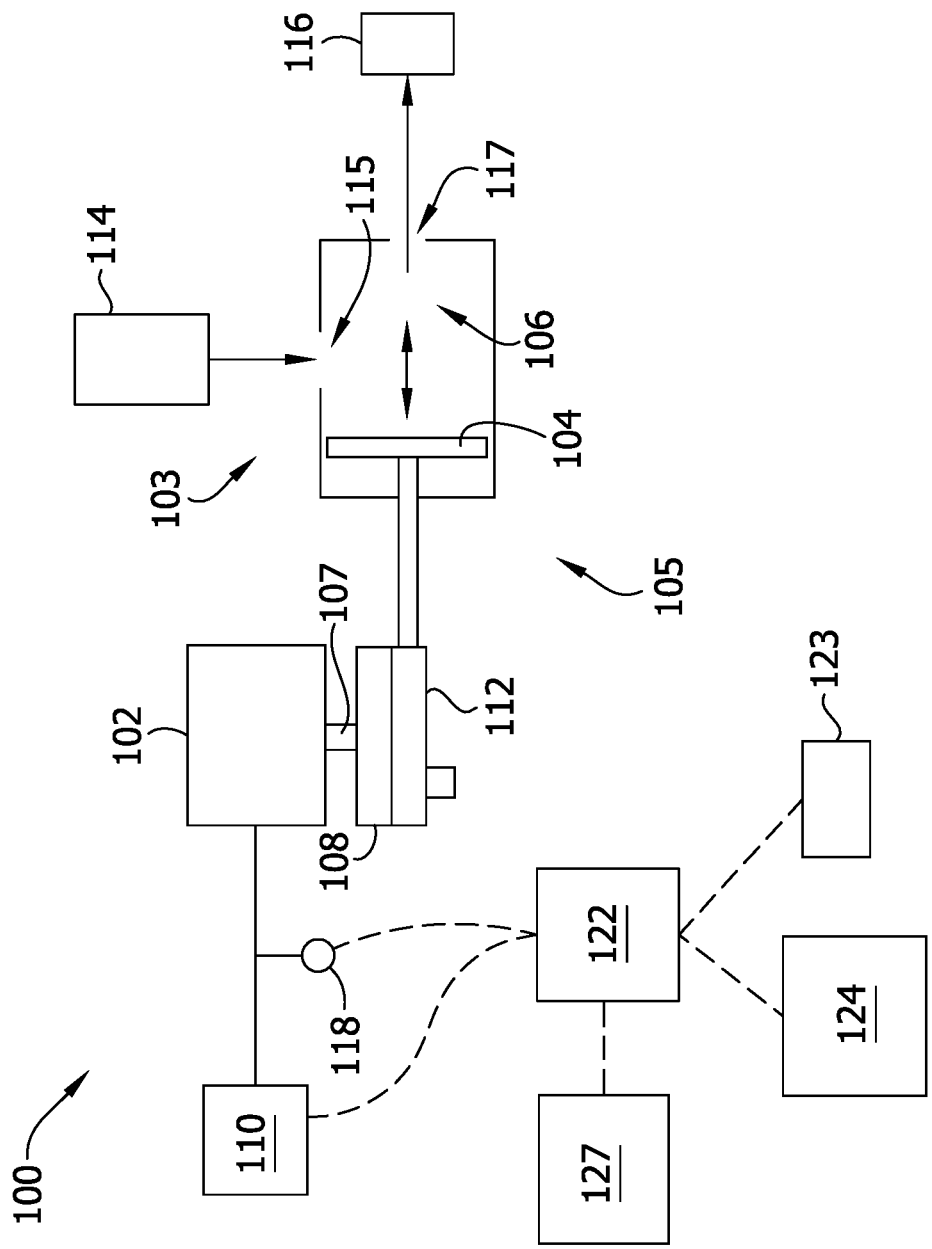
FIG. 1 is a schematic illustration of a grease dispensing device for dispensing a lubricant such as grease, according to one embodiment of the present disclosure.

Referring to FIG. 1, a schematic view of a grease dispensing device (e.g., grease gun) constructed according to the principles of the present disclosure is generally indicated at 100. The grease dispensing device 100 may be used to dispense a lubricant, such as grease, or any other fluid, oil, semi-solid lubricant, etc. For the purposes of this disclosure, the dispensing device 100 will be described in terms of dispensing grease, however, it will be understood that the dispensing device may be configured for delivery of other lubricants, fluids, etc., for lubrication or other purposes.

The grease dispensing device 100 includes a housing 101 (FIG. 4) and grease passaging 103 support by the housing. The grease passaging 103 includes an inlet 115 for receiving grease from a supply of grease. For example, in the illustrated embodiment, the grease dispensing device 100 includes a lubricant cartridge or reservoir 114, which may be a removable reservoir, a refillable reservoir, or the like. The reservoir 114 is coupled (e.g., fluidly coupled) to the inlet 115. The grease passaging 103 includes a grease dispensing outlet 117 for dispensing grease from the grease dispensing device 100. The dispensing outlet 117 may be coupled with a fitting 116 via one or more nozzles, conduits, etc. The grease passaging 103, such as the inlet 115 and outlet 117 may each include valves, such as check or poppet valves, configured to permit the grease to flow in the correct direction, as indicated, and prevent the flow from reversing.

The grease dispensing device 100 includes a grease drive system 105 arranged with respect to the grease passaging 103 to move grease through the grease passaging toward the grease dispensing outlet 117. The grease drive system 105 includes a motor 102 that drives a piston 104 in a priming chamber 106 (broadly, part of the grease passaging 103). The motor 102 may be any suitable type of motor, such as an AC or DC electric motor. The motor 102 is powered by a power supply 110, which may be a battery, a power cord, or any other type of electric power source.

The grease drive system 105 includes a linkage 108 that is rotated by the motor 102 via a shaft 107. The linkage 108 may include or be coupled with a yoke 112 (e.g., cam, crank, rack and pinon, etc.) configured to translate the rotary motion of the shaft 107 into reciprocating motion in the piston 104. The yoke 112 applies a bi-directional force on the piston 104, such that the piston 104 is extended and retracted in the priming chamber 106. As the piston 104 retracts (e.g., upstroke), a volume in the chamber 106 that is available for the grease is increased, and when the piston extends (e.g., downstroke), the volume in the chamber decreases.

The grease dispensing device 100 includes a sensor 118 arranged to sense grease in the grease passaging 103 and to generate sensor data related thereto. The sensor 118 is supported by the housing 101. In particular, the sensor 118 is arranged to sense a characteristic of the drive system 105 to sense grease in the grease passaging 103. In the illustrated embodiment, the sensor 118 is a current sensor and the sensor data is a current measurement. The current sensor 118 is configured to take a measurement of the current drawn by the motor 102 to move the piston 104. The amount of current drawn by the motor 102 correlates to the amount of force being applied by the piston 104 to move the grease through the grease passaging 103 and to the outlet 117. For example, a larger current is associated with a greater force applied to move the piston 104, and thus a greater resistance to moving the piston 104 in the chamber 106. The sensor 118 may be electrically coupled to the power supply 110, the motor 102, or anywhere in the power circuit between the two. It will be appreciated that other types of sensors (e.g., thermal sensor), and sensors arranged in other ways to sense grease in the grease passaging, can be used without departing from the scope of the present disclosure.

Figure 4:
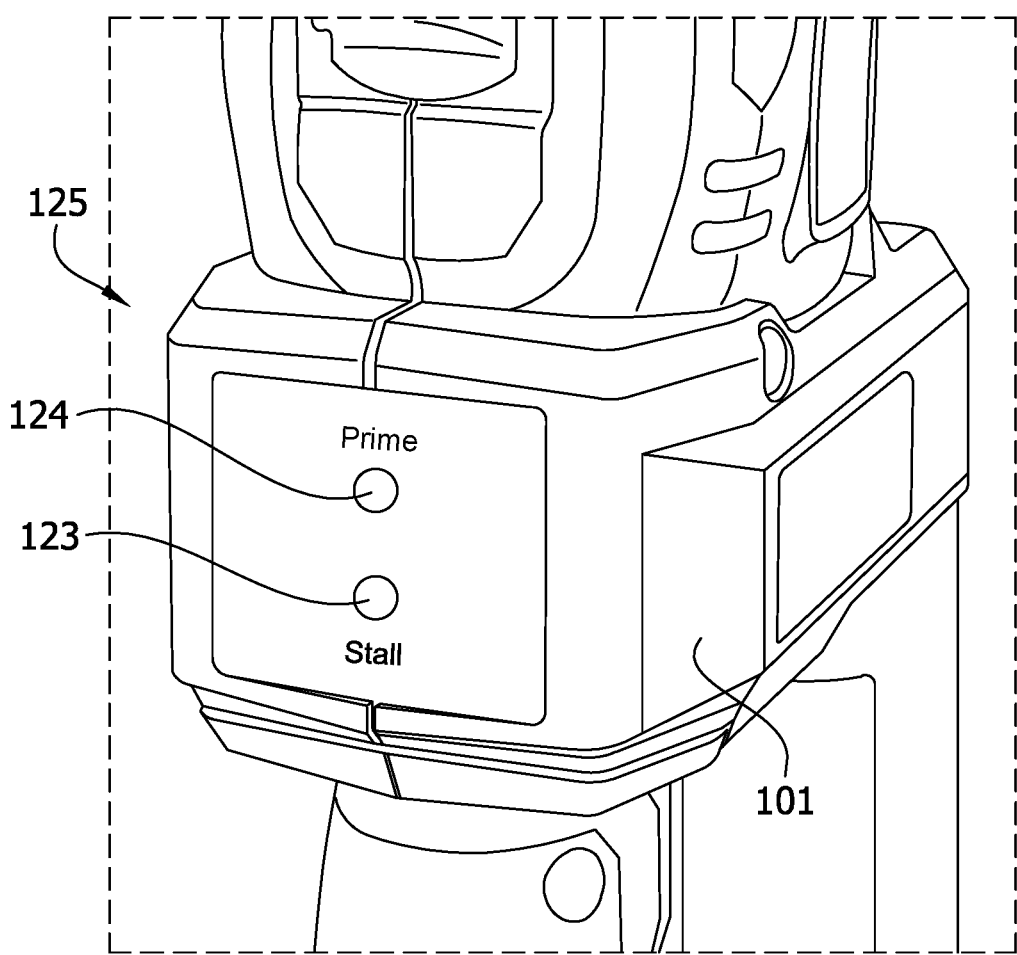
FIG. 4 is a perspective view of an indicator for the grease dispensing device.

The grease dispensing device 100 includes a user interface 125 (FIG. 4) that includes a prime indicator 124 (e.g., pump prime indicator), shown in FIGS. 1 and 4. The prime indicator 124 is configured to indicate to a user of the grease dispensing device 100 whether or not the grease dispensing device is primed with grease. In particular, the prime indicator 124 is configured to change between at least first and second states based on the sensor data. When in the first state, the prime indicator 124 represents (e.g., indicates) the grease dispensing device 100 is primed with grease. When in the second state, the prime indicator 124 represents the grease dispensing device 100 is not primed with grease. In the illustrated embodiment, the prime indicator 124 is a light such as a light emitting diode (LED), although other types of indicators are within the scope of the present disclosure. In this embodiment, the prime indicator 124 is active (e.g., illuminated) in the first state to indicate the grease dispensing device 100 is primed. Desirably, the prime indicator 124 is continuously active (e.g., continuously illuminated) while in the first state. In other words, desirably, the appearance of the prime indicator 124 remains unchanged while the prime indicator is in the first state. In one embodiment, the prime indicator 124 comprises a light that emits a green color while the prime indicator is in the first state. It will be appreciated that a constant green light gives the user an understanding that the grease gun is primed and in proper operating condition.

The second state of the prime indicator 124 is different than the first state. In one embodiment, the prime indicator 124 flashes (intermittently active) in the second state. The flashing by the prime indicator 124 is better suited to grab the user's attention to inform the user the grease dispensing device 100 has lost its prime. The user interface 125 also includes a stall indicator 123 to indicate to the user when the motor 102 of the grease dispensing device 100 is stalled. The stall indicator 123 is configured to change between at least first and second states to indicate whether or not the motor 102 is stalled. The stall indicator 123 may also be a light. In one embodiment, the stall indicator 124 is not active (e.g., illuminated) in the first state to represent the motor 102 is not stalled and active in the second state to represent the motor is stalled. When a stall occurs and the stall indicator 123 is in the second state, the prime indicator 124 will also be in its first state, as a stall can only occur when the device 100 is primed. In the illustrated embodiment, the user interface 125 is free of any indicia representing the quantity of grease dispensed, yet to be dispensed, and/or remaining in the reservoir 114, any indicia representing battery life, any indicia representing grease dispensing settings, and any indicia representing whether the motor 102 is operating, although one or more of these may be included. This provides a relatively clean appearance and a relatively uncluttered user interface 125, which enhances user understanding and awareness of the prime and stall indicators 124, 123. Other configurations of the user interface 125 are within the scope of the present disclosure.

The grease dispensing device 100 includes a controller 122 (e.g., grease controller), communicatively coupled to the motor 102, the sensor 118, user interface 125, a trigger 127 and/or the power supply 110. The controller 122 includes a CPU or processor (e.g., a grease processor) and RAM or memory 124 (broadly, non-transitory computer-readable storage medium). The processor (not shown) provides the computing engine that drives the operation of the controller 122. Broadly, the tangible storage medium (not shown) includes (e.g., stores) processor-executable instructions for controlling the operation of the processor. The instructions embody one or more of the functional aspects of the controller 122, with the processor executing the instructions to perform said one or more functional aspects.

The trigger 127 is communicatively coupled to the controller 122 and actuation of the trigger instructs the controller to operate (e.g., power) the motor 102 to dispense grease. Desirably, the prime indicator 124 and stall indicator 123 are only active (e.g., illuminated) when the trigger is actuated. For example, the prime indicator 124 may only be in the first or second states when the trigger is actuated or after the trigger has been actuated and a loss of prime has occurred. Accordingly, the prime indicator 124 may be in a third state (e.g., inactive, not illuminated) when the trigger 127 is not actuated. The controller 122 may only monitor the sensor 118 when the trigger 127 is actuated to determine a loss of prime.

The controller 122 is configured to determine whether or not the grease dispensing device 100 is primed with grease, as described in more detail below. As shown in FIG. 1, the controller 122 is operatively connected to the sensor 118. The controller 122 monitors the sensor data from the sensor 118 to determine whether the grease dispensing device is primed with grease. The controller 122 is also operatively connected to the prime indicator 124 for controlling the operation (e.g., state) of the prime indicator. The controller 122 is configured (e.g., includes instructions) to change the state of the prime indicator 124 based on the sensor data. For example, when the controller 122 determines the grease dispensing device 100 is not primed with grease, based on the sensor data, the controller changes the prime indicator 124 from the first state to the second state.

When the controller 122 determines the grease dispensing device 100 is not primed (e.g., has lost its prime), the controller is configured to delay changing the prime indicator 124 from the first state to the second state for a delay period (e.g., the instructions include delay instructions). This delay period may be about four seconds or less, although other periods are within the scope of the present disclosure. For example, the delay period may be about 1 second or less, about 2 seconds or less, about 2 seconds or less, about 5 seconds or less, about 6 seconds or less, about 7 seconds or less, about 8 seconds or less, etc. During this delay period, the controller 122 is configured to continue monitoring the sensor data to determine whether the grease dispensing device 100 is primed with grease (e.g., has regained its prime) before changing the prime indicator 124 to the second state. If the controller 122 determines the grease dispensing device 100 is primed with grease during the delay period, the controller is configured to not change the prime indicator 124 from the first state to the second state. This ensures that the prime indicator 124 only indicates an enduring loss of prime, not a temporary loss of prime. Temporary losses of prime can be relatively frequent and would result in the prime indicator frequently changing between prime and no prime indications (e.g., between the first and second states) and confusing the user, if the delay period was not utilized. Frequent losses of prime may also give the user the impression that the device 100 performs poorly at maintaining prime even though the issue is attributed to the grease supply having air pockets. If the controller 122 determines the grease dispensing device 100 has become re-primed, the controller ends the delay period and continues to monitor the sensor data until another loss of prime is detected, at which point the process repeats.

A loss of prime (e.g., not primed) may be defined as receiving air into the priming chamber 106, rather than or in addition to grease, which either temporarily or continuously prevents or inhibits the piston 104 from drawing a full amount of grease into the chamber and/or pushing a full amount of grease out of the chamber and toward the outlet. As used herein, the term "temporary" loss of prime refers to a situation where the grease dispensing device 100 loses its prime but can regain its prime by the continued movement of the piston 104 (e.g., continued operation of the drive system 105) for a short period of time, such as the delay period. In other words, the loss of prime does not require user intervention in order to prime (e.g., re-prime) the grease dispensing device 100. For example, a temporary loss of prime is typically the result of small air pockets in the grease entering the chamber 106 but then being pushed through the chamber 106 by the piston 104. As used herein, the term "enduring" (e.g., continuous) loss of prime refers to a situation where the grease dispensing device 100 loses its prime and cannot regain its prime by the continued operation of the drive system 105 for the short period of time. In other words, the loss of prime requires user (e.g., manual) intervention in order to prime the grease dispensing device 100. For example, an enduring loss of prime is typically the result of large pockets of air entering the chamber 106 from the grease in the reservoir 114, or when the conduits between the reservoir and chamber are partially empty due to the changing of an empty reservoir with a full reservoir, or when the reservoir is empty.

Further details of grease dispensing devices 100 are described in U.S. Patent Publication No. 2015/0114991 and U.S. Pat. No. 8,915,331, the entireties of which are hereby incorporated by reference.

In operation of the grease dispensing device 100, the motor 102 drives the piston 104 to retract (upstroke) and extend (downstroke) in the priming chamber 106. Driving the piston 104 on the upstroke reduces pressure in the priming chamber 106, thereby drawing (e.g., urging) grease from the reservoir 114 and into the priming chamber 106. On the downstroke 104, the piston 104 drives the grease through the priming chamber 106 and out of the outlet 117.

Figure 2:
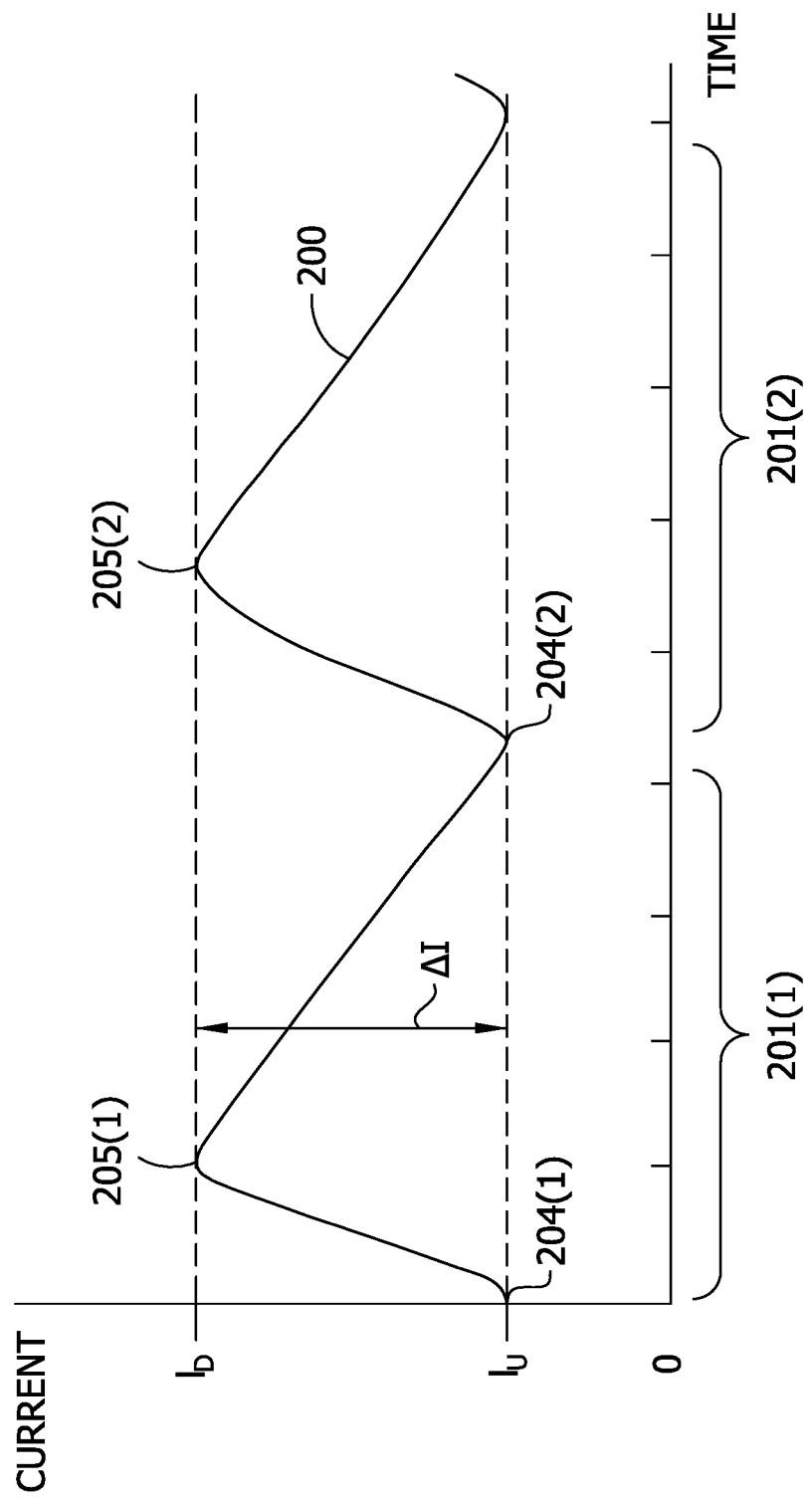
FIGS. 2 and 3 are current versus time relationship graphs of power supplied to a motor of the grease dispensing device.

FIG. 2 illustrates a simplified current versus time relationship 200, accordingly to one embodiment, for the motor 102. This current versus time relationship 200 may be derived from the electrical current measurements taken by the sensor 118. In some cases, the current versus time relationship 200 may include non-linearities, noise, time delays, etc., such that the relationship deviates from the simplified relationship shown. The relationship 200 reflects normal operation of the grease dispensing device 100 (e.g., when the drive system 105 is dispensing grease). In operation, the piston 104 undergoes cycles, two of which are shown as 201(1) and 201(2). Each cycle includes an upstroke and a downstroke. During operation, the current drawn by the motor 102 varies according to the position and direction of movement of the piston 104. For example, in the first cycle 201(1), the piston 104 undergoes an upstroke at 204(1) and a downstroke at 205(1). Similarly, in the second cycle 201(2), the piston 104 undergoes an upstroke at 204(2) and a downstroke at 205(2). Because there is relatively little impeding the progress of the piston 104 during the upstrokes (e.g., including points 204(1)-(2)), the current drawn by the motor 102 reaches a minimum during the upstroke. This relatively low current associated with the upstroke is shown as Iu.

As mentioned above, during the upstrokes, while the grease dispensing device 100 is operating normally, the grease is drawn into the priming chamber 106. At the end of each upstroke, the piston 104 changes directions and begins a downstroke (e.g., including points 205(1)-(2)), thereby forcing the grease through the outlet 117. During this time, the current drawn by the motor 102 reaches a maximum. The current drawn by the motor 102 during downstrokes is expected to be higher than the current drawn by the motor during upstrokes, since the advancement of the piston 104 on the downstroke is to be resisted by the grease being moved through the outlet 117 at pressure. At its maximum points (e.g., at points 205(1)-(2)), the current during the downstroke is shown as ID.

During normal operation, as the piston 104 drives grease from the reservoir 114 to the fitting 116, the current applied to the motor 102 cyclically varies between Iu and ID, as shown. However, the specific current drawn by the motor 102 may vary from grease dispensing device 100 to grease dispensing device. Accordingly, the controller 122 is configured to monitor the change in current ΔI between the maximum current ID drawn during the downstroke and the minimum current Iu drawn during the upstroke, so as to determine the efficacy of the piston cycle in pumping grease.

Figure 3:
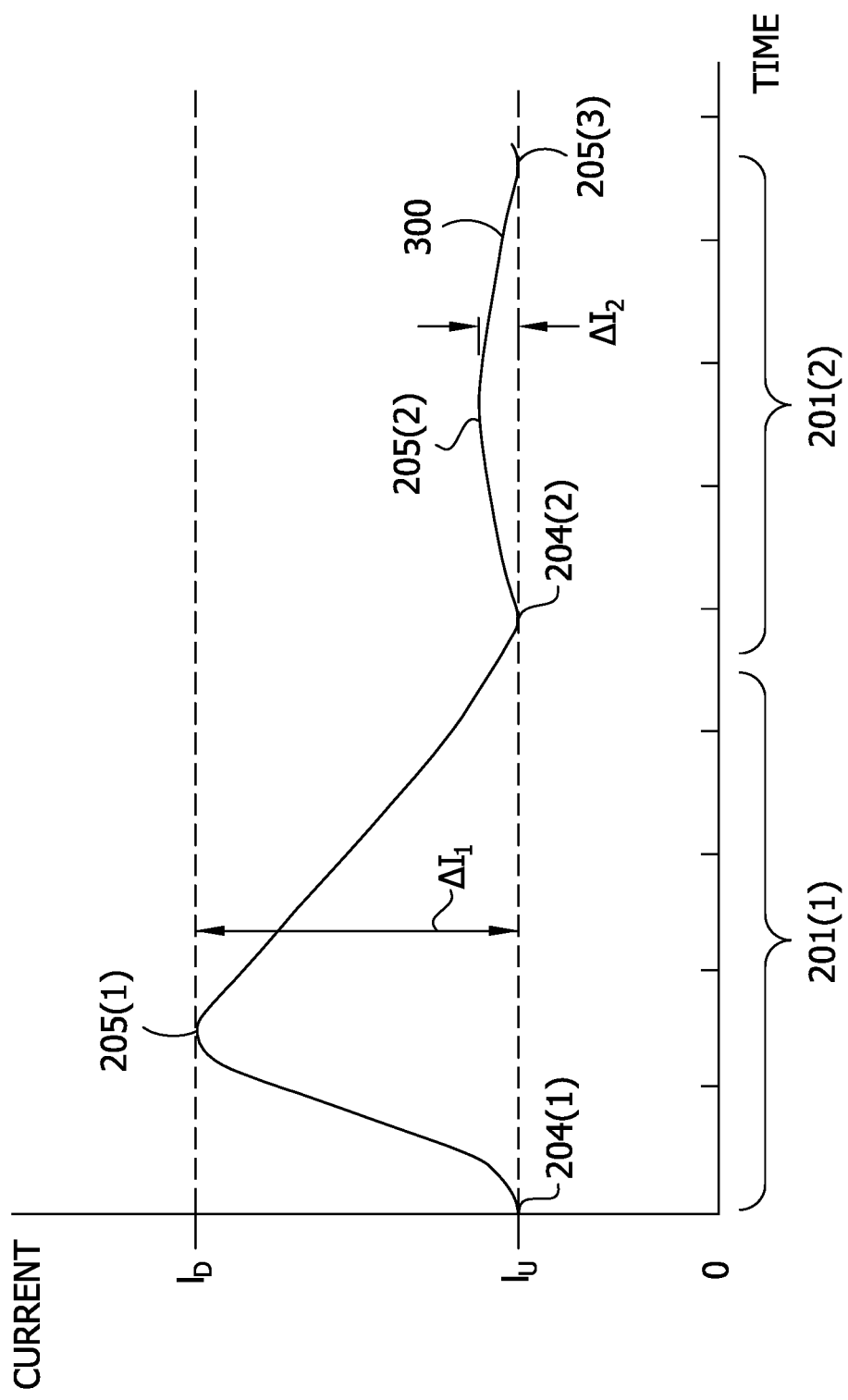

FIG. 3 illustrates a current versus time relationship 300 during a loss of prime of the grease dispensing device 100. During a loss of prime, the grease dispensing device 100 may draw air into the priming chamber 106 such that at least one, or part of one, of the downstrokes results in air, rather than grease, being ejected through the outlet 117. In the illustrated relationship 300, the second cycle 201(2) includes a downstroke during a loss of prime. During a loss of prime, the force required to push the piston 104 during the downstroke is less than when the priming chamber 106 is full of grease. Accordingly, the maximum current drawn by the motor 102 during the downstroke (e.g., at point 205(2)) is less than the maximum current drawn by the motor during the downstroke with prime (e.g., the first cycle at point 205(1)). For example, the maximum current drawn by the motor 102 during the downstroke of the second cycle 201(2) (e.g., during a loss of prime), may be about the same as the minimum current drawn by the motor 102 during the upstrokes, or may be slightly more.

As a result, the current change $\Delta I_1$ between the minimum at 204(1) and maximum at 205(1) (e.g., ID and Iu) during the first cycle 201(1) is greater than the current change 412 between the minimum at 204(2) and the maximum at 205(2) during the second cycle. The controller 122 determines, based on the current change $\Delta I_1$ being above a predetermined threshold and the current change 412 being below the predetermined threshold, that the grease dispensing device 100 was primed during the first cycle 201(1) and that the grease dispensing device 100 was not primed (e.g., lost its prime) during the second cycle 201(2). Accordingly, the controller 122 begins counting down the delay period. If the controller determines, based on the ΔI, that none of the subsequent cycles (not shown) during the delay period were primed, the controller changes the prime indicator 124 from the first state to the second state, to indicate a loss of prime has occurred. Desirably, the controller 122 also turns of the motor 102.

As mentioned above, in some cases, the grease dispensing device 100 may recover from the loss of prime in subsequent cycles, for example, after an air pocket is passed through the outlet 117 (e.g., temporary loss of prime). In this situation, the controller 122 would determine a cycle during the delay period was primed and therefore stop counting down the delay period and reset to continue monitoring the sensor data until another loss of prime is determined. In other situations, such as when the reservoir 114 is out of grease, the grease dispensing device 100 may not be able to recover without intervention (e.g., refilling reservoir 114 and reloading a full reservoir). Such situations can lead to cavitation. In cavitation, the piston 104 is unable to pump air or grease, and thus the piston 104 may generally operate with relatively little resistance on the upstrokes and downstrokes, resulting in a current differential ΔI being below range or threshold. In this situation, the controller 122 would determine every cycle during the delay period was not primed and therefore change the prime indicator 124 to indicate a loss of prime.

Figure 5:
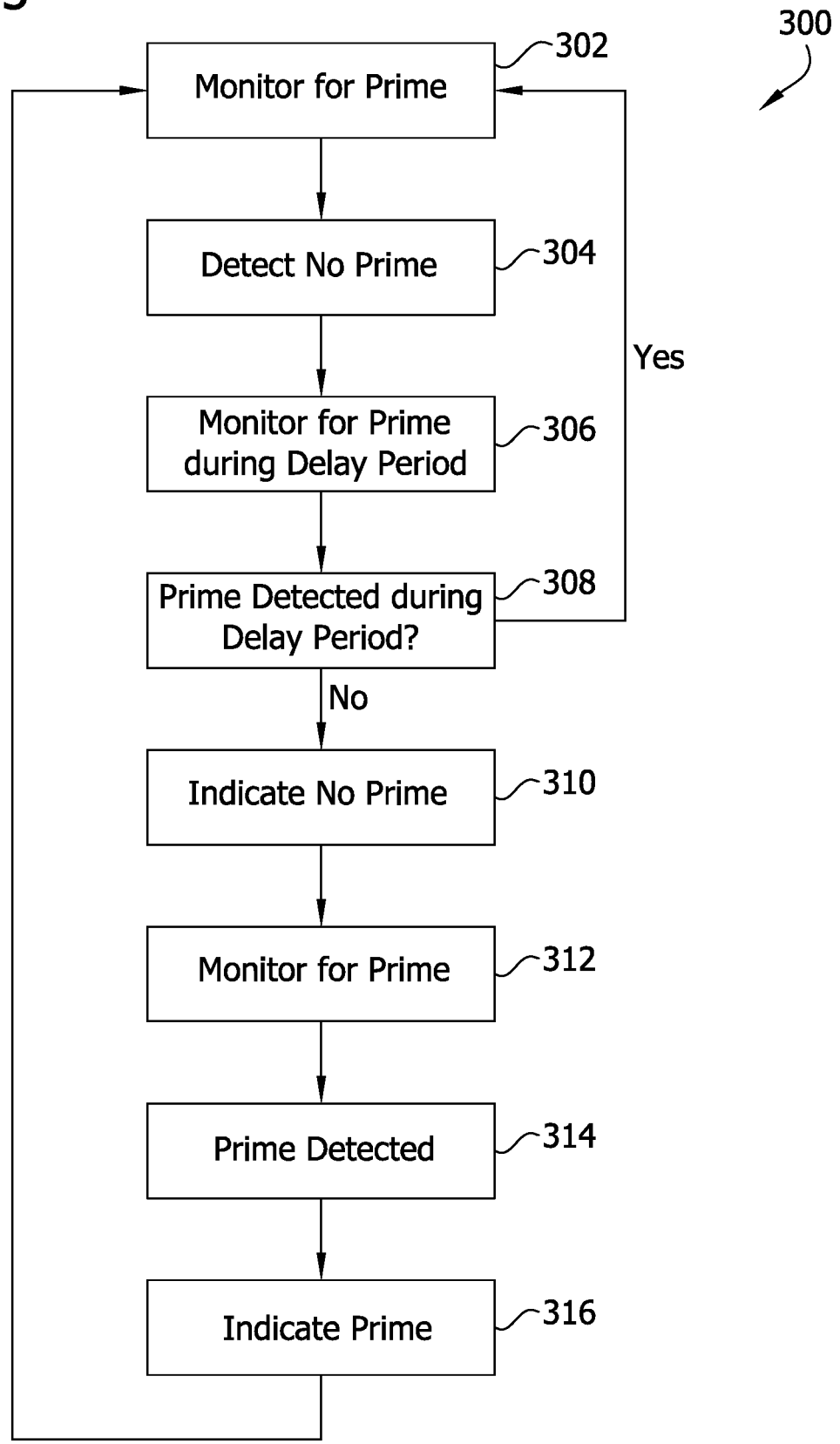
FIG. 5 is a diagram illustrating operation of the grease dispensing device.

Referring to FIG. 5, a diagram 300 illustrating operation of the grease dispensing device 100 is shown. In particular, diagram 300 illustrates the operation of the controller 122 for indicating whether or not the grease dispensing device 100 is primed. At step 302, while the motor 102 is powered, the controller 122 is monitoring the sensor data to determine if the grease dispensing device 100 is primed. At step 304, the controller 122 determines (e.g., detects) that the grease dispensing device 100 is no longer primed. At step 306, the controller 122 continues to monitor for prime during the delay period. At step 308, if the controller 122 determines the grease dispensing device 100 is primed (e.g., has regained its prime) before the delay period has expired, the controller 122 goes back to step 306 and continues to monitor for prime. If the controller 122 determines the grease dispensing device 100 is still not primed once the delay period expires (e.g., the grease dispensing device lost its prime for the entire delay period), the controller 122 changes the prime indicator 124 from the first state to the second state to indicate no prime, at step 310. At step 314, the controller 122 detects that the grease dispensing device 100 is primed. At step 316, the controller changes the prime indicator 124 from the second state to the first state to indicate the grease dispensing device 100 is primed. This process repeats as long as the grease dispensing device 100 is operating to dispense grease (e.g., as long as the trigger 127 is actuated).

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

It will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the claims, it is intended that all matter contained in the above description and shown in the accompanying drawings shall be interpreted as illustrative and not in a limiting sense.

What is claimed is:

1. A grease dispensing device comprising:
 a housing,
 grease passaging supported by the housing, the grease passaging including a grease inlet for receiving grease from a supply of grease, and the grease passaging including a grease dispensing outlet for dispensing grease from the grease dispensing device, a grease drive system arranged with respect to the grease passaging to move grease through the grease passaging toward the grease dispensing outlet, a sensor supported by the housing and arranged to sense grease in the grease passaging and to generate sensor data related thereto, a user interface comprising a prime indicator, the prime indicator configured to change between at least first and second states based on the sensor data, the prime indicator in the first state representing the grease dispensing device is primed with grease, the prime indicator in the second state representing the grease dispensing device is not primed with grease, and a grease controller and a tangible storage medium storing instructions executable by the grease controller, the grease controller operatively connected to the sensor for monitoring the sensor data to determine whether the grease dispensing device is primed with grease, the grease controller operatively connected to the prime indicator for controlling operation of the prime indicator, the tangible storage medium storing grease controller executable instructions to change the state of the prime indicator based on the sensor data, said instructions including delay instructions to delay changing the prime indicator from the first state to the second state for a delay period after the controller determines the grease dispensing device is not primed with grease.

2. The grease dispensing device of claim 1, wherein said instructions include instructions for monitoring the sensor data, during the delay period, to determine whether the grease dispensing device is primed with grease before changing the prime indicator to the second state.

3. The grease dispensing device of claim 2, wherein the controller does not change the prime indicator from the first state to the second state if the grease dispensing device is primed with grease during the delay period.

4. The grease dispensing device of claim 3, wherein the delay period is about 4 seconds or less.

5. The grease dispensing device as set forth in claim 1, wherein the prime indicator is active while the prime indicator is in the first state.

6. The grease dispensing device as set forth in claim 5, wherein the prime indicator is continuously active while the prime indicator is in the first state.

7. The grease dispensing device as set forth in claim 1, wherein an appearance of the prime indicator remains unchanged while the prime indicator is in the first state.

8. The grease dispensing device as set forth in claim 1, wherein in the second state the prime indicator flashes.

9. The grease dispensing device as set forth in claim 1, wherein the grease passaging includes a chamber, the grease drive system includes a piston movable in the chamber, and the sensor is arranged to sense grease in the cylinder.

10. The grease dispensing device as set forth in claim 1, wherein the sensor is arranged to sense a characteristic of the drive system to sense grease in the grease passaging.

\* \* \* \* \*